Figure 1:
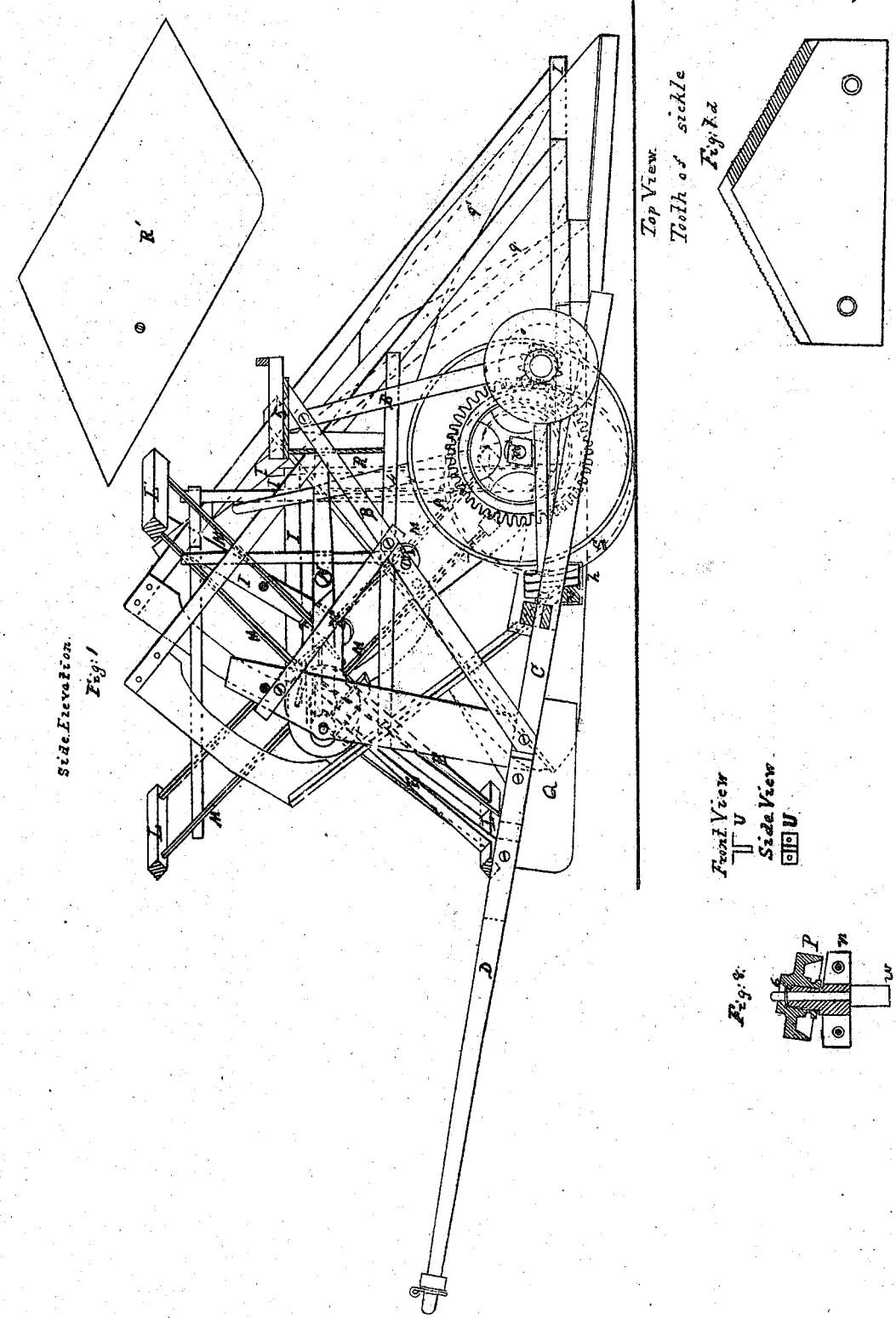
Figure 2:
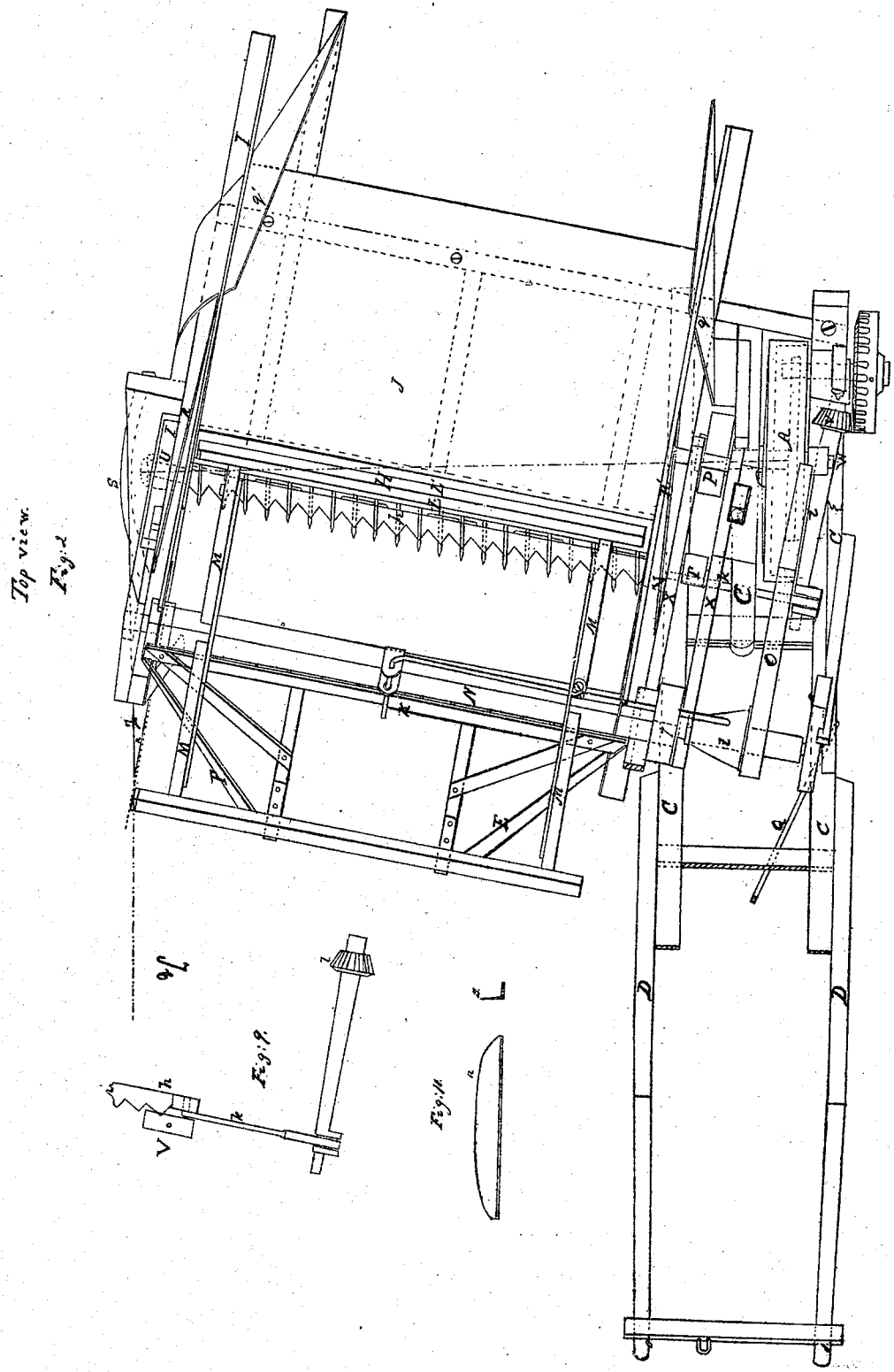
Figure 3:
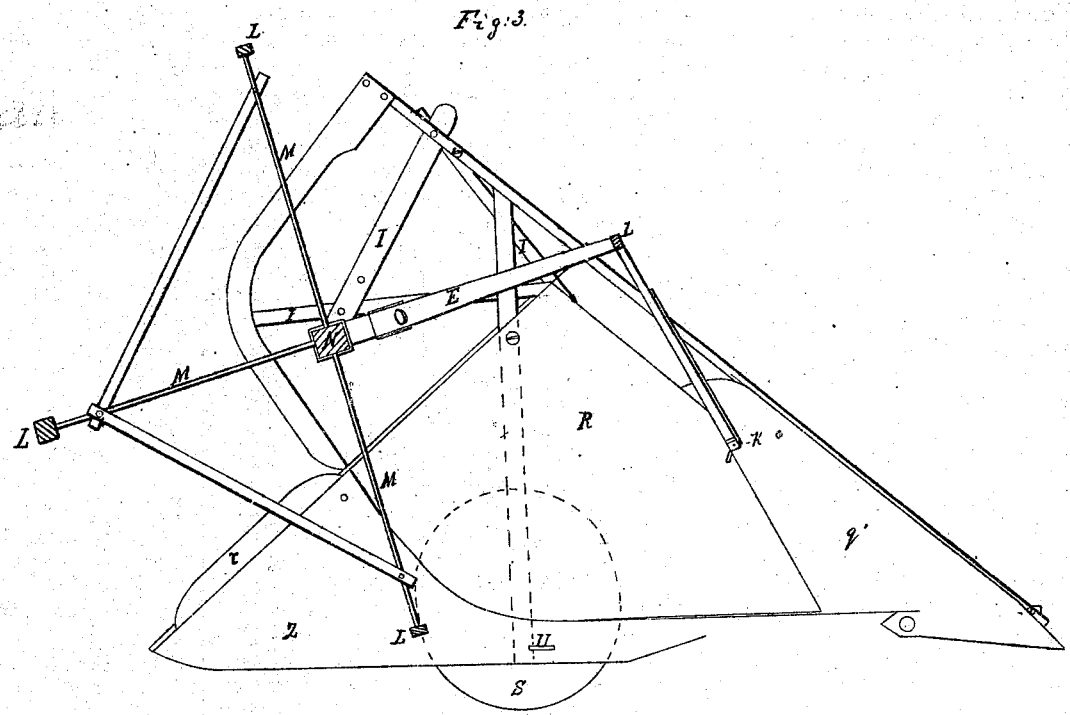

Sheet 3-3 Sheets

A. Whiteley.
Mower.

Nº 12769.  Patented Apr. 24, 1855.

Internal view of right end.

UNITED STATES PATENT OFFICE.

ABNER WHITELY, OF SPRINGFIELD, OHIO.

IMPROVEMENT IN HARVESTERS.

Specification forming part of Letters Patent No. 12,769, dated April 24, 1855.

*To all whom it may concern:*

Be it known that I, ABNER WHITELY, of the county of Clarke and State of Ohio, have invented several new and useful Improvements in Grain and Grass Harvesters; and I do hereby declare that the following is a full, clear, and exact description of the construction and operation of the same, reference being had to the annexed drawings, making a part of this specification.

These improvements enable me to combine an automatic raker or deliverer of the cut grain received on the platform of the reaper with placing the finger-bar and platform oblique to the line of draft, cutting the rear angle formed by the line of draft and finger-bar less than a right angle, also a chute on the rear of the platform on the side opposite the master-wheel, and constructing the machine with shafts so as to drive tandem, so as not only to deliver the cut grain in bunches or sheaves on the ground, but also to reel down and convey the grain on a continuous straight line across the platform, said line being as much oblique to the line of draft as the finger-bar is to the right angle to the line of draft, so as to clear the road for the team when cutting the next swath, and cause the reel to bring in the grain in front of the divider and avoid tangling the grain in its passage through the machine; attaching the grain-wheel at such a point to the side of the machine that the line of the sickle will come within its diameter, and generally near the center, so as to cut the stubble of uniform height; furnishing the sickle-bar with a groove extending through the divider and extending to the first finger, for the end of the sickle to play out of the divider and return in, so as to cut with a short sickle and permit said wheel occupying said position; placing the finger next the divider at right angles to the finger-bar, and making it longer than the other fingers, so as to remove part of the grain that accumulates in the corner to the next space to be cut; making the edges of the adjacent sides of the sickle-teeth unequal, so as to cause them to cut with the same angle on both sides of the finger, also the spring-guides for the rake to turn on after delivering the sheaf, and the cone or funnel on the knee-lever balancing the rake by means of a larger and heavier rod on the opposite side of the reel; contracting the width of the sheaf, when being discharged, by means of the chute above mentioned on one side and guide on the opposite side; the mode of driving the driving-belt pulley with its axis of motion oblique to the line of the shaft which drives it; the cutter on the divider to enable the divider to do its work; the scraper in front of the master-wheel, and gearing to remove the cut grain out of the way of the machine; attaching the grain-wheel to the machine at a point forward of the line of the master-wheel shaft and opposite the end of the sickle-bar, so as to cut the stubble of a uniform height, balance the machine, take off side draft, and cause the machine to turn easy at the corners, making the sickle-teeth serratted on the smooth side and grinding the bevel, thus retaining the thickness of the plate and a close shear-edge, securing the bolt between the side guides and tightening it by means of a friction-roller.

In the accompanying drawings, Plates I and II, Figure I is a side elevation; Fig. II, a top view; Fig. III, an internal view of right end; Fig. VII, a top view of the sickle-tooth; $d$ and $c$, an end view; Fig. VIII, a section of the driving-belt, pulley P, box $n$, and part of the master-wheel shaft W; Fig. IX, crank $i$, pitman $k$, and end of sickle $h$; Fig. X, cutter on divider $r$, and 2 the belt-hook.

A is the master-wheel; D D, the shafts for the rear horse, on the front of which is a cross-piece having the staple 3 in it for hitching the front horse.

5 is the driver's seat, and 4 his foot-rest.

B B is an angular frame, rising from the wheel-frame. $i\ i\ i\ i$ is a frame on the opposite side, and between these two are placed the finger-bar H and platform J. These, with the reel-shaft N, are placed oblique to the line of draft, cutting the rear angle formed by the finger-bar and line of draft less than a right angle.

Z is the nose or divider.

$r$ is the cutter on the divider.

$q'$ is a chute made of wood or sheet metal, and made fast to the platform J and frame I I I I, with its rear end descending and turned away from the standing grain.

Q is a scraper placed under the front of the wheel-frame and oblique to the line of draft, having its rear end extending beyond the left-hand side of the machine and its front end extending into the line of the master-wheel A.

On the opposite side of the platform from the chute $q'$ is a guide, $q$, made of wood or sheet metal, and extending back from the machine, and its rear end is inclined toward the standing grain.

L L L are three of the reel-rods, and are connected to the shaft N by arms M M M. The fourth one is connected by angular arms E E to the shaft N. On this shaft, and in front of the driver's seat 5, is the cone or funnel $t$ on the knee-lever O, for the purpose of operating the lever Y to latch the rake K. Said lever O is provided with a slot to permit it to slide freely on the shaft N, and when moved by the knee to the right it throws the end of lever Y out from the shaft N, said lever being pivoted on M, and causes the end which passes through the shaft N to project far enough to catch the rake K and retain it until the lever O is removed to let the rake K discharge the sheaf. It will be seen that the cone $t$ acts equally during the revolution of the reel on Y.

V is a guide to the joint connecting the pitman and sickle $h$, and secures it from working out of the eye of the sickle.

U is a groove in which the end of the sickle opposite the crank plays, and is made of sheet metal. It extends through the divider Z and to the first finger.

Alternate parts of the rear of the sickle bar and teeth are removed, so as to produce alternate self-reversing bearings by so arranging the rear portions of the rear of the sickle-bar with the shoulders of the fingers that while said rear portions of the bar rest against one set of shoulders the open spaces are opposite the other set, and when, by the motion of the crank, the bar is so moved as to cause the rear portions to bear against the last-mentioned shoulders the spaces will be opposite the first-mentioned shoulders, and so alternately reversing.

$h$ is the sickle, and is made of the same length as the cut of the machine, thus making the groove U necessary. Said groove extends through the divider and to the first finger, and is for the end of the sickle to return in after it has been drawn out of the divider, and prevent the grain passing in behind it. It will be seen that when a sickle of the same length as the cut of the machine is used it must necessarily be drawn out of the divider one-half of the distance it is vibrated, and thus the bar is moved one-half of its working distance before the end reaches the inside of the divider. Consequently it only reaches into the divider one-half of its working distance, thus leaving one-half of the space occupied by the end of the common long sickle for the grain-wheel, and by this arrangement I am enabled to attach the grain-wheel S opposite the end of the sickle, and at the same time bring its point of bearing on the ground within the space cleared by the divider. The teeth of the sickle are made with one of the cutting-edges longer than the other, to make them cut with equal angles on both sides of the fingers. The sickle, when vibrated, works obliquely in the fingers, the benefit of which will hereinafter be shown. The finger next the divider is longer than the other fingers, and set at right angles to the finger-piece H, which makes it diverge from the line of draft.

R R are spring-guides on the inside of the machine, and are made of wood with springs behind them, or of sheet metal, and are for the rake K to ascend on after it has delivered the sheaf.

L is a larger and heavier reel-rod than the others, made to balance the rake K.

P is a pulley receiving motion from the master-wheel shaft W, which pulley runs on a stud on box, $n$, whose center is oblique to the master-wheel shaft W. This is done as follows: The center of the hole in the box $n$ and stud is just as much oblique to the center of the stud as the reel-shaft N is to the right angle of the line of draft—that is, the stud and reel-shaft are parallel to each other. The pin 6 in the shaft W, to drive said pulley, occupies the exact point where the centers of the shaft W and stud meet or cross each other. The larger part of the bore in said pulley P fits on the stud, while the smaller part leaves a portion of the hub of wheel, when slotted, for said pin 6 to work in and drive the pulley.

$d$ is a sickle-tooth, both edges of which have been swaged down on the smooth side, forming recesses in which to make the serrated edge, (very deep serrating will answer the same purpose without swaging,) and serrated and ground off beveling on the other side, leaving the serrating on the smooth side, so as to be ground in the same manner as the smooth edge without diminishing the thickness of the plate and retain a close shear-edge.

2 is a belt-hook, having a head on one end and a short bend at a right angle near the head and a hook at the other.

X X are side guides, between which a belt runs.

T is a friction-roller, running on an axle between said guides for tightening the belt.

S is the grain-wheel, and is secured, at any desired height of stubble, to the side of the machine by a single bolt passing through a short arm or axle.

The operation of this machine is as follows: The horses being hitched tandem, and the finger-bar H, platform J, and reel being oblique to the line of draft when the machine is drawn forward, the reel-rods L L L L, when they enter the grain in front of the reel-shaft N, extend into the grain at the side of the machine, so as to bring in all the grain in front of the divider Z, although leaning sidewise six degrees; and when the rake K is dropped it moves the grain across the platform J in the same straight line in which it was reeled down, but not in a line parallel with the line of draft, but at right angles to the reel-shaft N. Now, when the grain reaches the chute $q'$ it is some fifteen inches from the standing grain, the top then being turned still farther by means of the chute $q'$ before it reaches the ground. It is then removed so far as to admit the team, when thus hitched, and machine to pass between the bunches and the standing grain. Again, when the team walks too far from the standing grain, so as to bring the machine onto the bunches, the scraper Q removes them out of the road of the machine. The chute $q'$ and guide $q$ each incline the tops of the grain together, so as to contract the width of the sheaf and make it more easily taken up for the purpose of binding.

The operation of the cone $t$ on the knee-lever O and slot in the lever will readily be understood, and it will be seen that by this I not only dispense with some machinery, but make it more easily operated than by the arrangement in my former patent.

The use of the joint-guide V to the joint connecting the pitman $k$ and sickle $h$ is to dispense with some machinery and avoid breakage, (because when a key is used in the end of the hook of the pitman to hold the joint together the key is likely to lose out, when the hook will work out, so as to cause it to break,) the key and end of the hook being dispensed with. The cutter $r$ on the divider Z is used to cut the way through the lodged grain and grass, and its use will be readily understood. The groove U is to secure the return of the end of the sickle into the mortise in the divider and prevent the grain passing in behind it when it is drawn out of the divider.

The alternate spaces in the rear of the sickle bar and teeth are for the purpose of permitting any grass or grain that may accumulate on top of the teeth to pass back and drop out, as while the bar rests against the shoulder of one finger the space is open at the other. The sickle $h$, working oblique in the fingers, is inclined to work all rubbish back where it can drop out. The sickle $h$ is made the same length as the cut of the machine, so as to permit the grain-wheel S being attached opposite to the end of it, thus making the groove U necessary. The edges of the sickle-teeth are made unequal, so as to make the angle of cut against the opposite sides of the fingers equal—a necessary consequence of the obliquity of the fingers to the bar.

The finger next the divider is made longer than the others and placed at right angles to the finger-bar H, which makes it diverge from the line of draft, so as to remove a portion of the grain which accumulates in the corner to the next space to be cut. This is necessary, as the quantity is often so great that it cannot be cut in one space. Consequently the machine will run over it.

The spring-guides R are for the rake K to return on after delivering the sheaf and preventing it from swinging back and coming in contact with the falling grain, said guides closing in behind it after it has passed between them. Thus it has to move up the rear of the guides R until it gets too high to catch the falling grain as it passes into the reel again.

The pulley P, when placed on the stud on box $n$, is made to revolve on the same and drive the reel and rake K by means of a belt passing over it and pulley 7 on the reel-shaft, by means of the pin 6 in the master-wheel shaft W. When the machine is moving this oblique position of the pulley P is necessary in driving the reel and rake K by said pulley.

$d$ is a sickle-tooth, and is serrated on the smooth sides in a recess just sufficient to prevent the serrating from being worn against the finger. The same may be accomplished by very deep serrating, so as to leave enough of the cut of the chisel, after the face has again been ground off smooth, to leave a good serrated edge, so as to grind the bevel and retain a close shear-edge without reducing the thickness of the plate.

The use of the belt-hook 2 will be understood. It is designed to take the place of the buckle and the thong, possessing the advantages of both. The buckle is used to shorten a belt without cutting it, but is very apt to tare the belt. The whole strength of the belt cannot be used with a buckle. Besides, it cannot be used in the side guides. A thong can be used only at the end of the belt, and must be cut off at the end to shorten it. Now, hooks of the above kind will overcome both these difficulties, as they will pass through side guides, as well as a thong, and can be moved to any set of holes and hooked in without cutting the belt. X X, the side guides, secure the belt on the pulleys P and 7 when the machine is strained or twisted, so as to throw said pulleys out of line. The friction-roller T, running between the side guides, X X, on an axle, serves to tighten the bolt and keep it tight on the pulleys and take up the slack of the belt until it stretches enough to hook in another set of holes.

There are four distinct reasons for placing the grain-wheel S opposite the end of the sickle-bar and forward of the line of the master-wheel shaft—

First. To cause the machine to cut the stubble of a uniform height on uneven ground. This will be understood.

Second. Said wheel, when placed forward of the line of the master-wheel shaft, and having its axle placed in a radial line from the center of the master-wheel, will have its plane converging toward the team, and when drawn forward will press toward the team, and thus take off side draft or incline to run the machine out of the grain. This, it will be seen, could not be done with the wheel S on the line of the shaft of the master-wheel, as it would then only press directly against the master-wheel, and only for the great weight on the master-wheel would cause the rear end of the machine to run off around the horses, the same as the master-wheel would if the front edge of it were inclined from the grain; but the great weight on the master-wheel causes it to hold firmly to the ground, and the grain-wheel S being placed forward of the line of the master-wheel shaft it of course presses a point forward of the bearing of the master-wheel on the ground and incline the machine to turn to the left, while the grain, pressing against the cut of the machine and divider, inclines it to turn to the right.

Third. It will be seen that when the axle of the grain-wheel is on said radial line the machine will always turn easy at the corners, as the master-wheel is the point on which all side reaping-machines turn at the corners.

Fourth. It is the point on which the machine is properly balanced, leaving just weight enough on the neck of the horse.

Having thus described my improvement, I am aware that grain has been reeled down, cut, and conveyed over the platform and discharged in a continuously-straight line parallel to the line of draft; and I am aware that curved and bent platforms, and also platforms oblique not only to the line of draft, but also to the reel and finger-bar, have been used to discharge the grain behind the master-wheel, or otherwise remove it from the standing grain; but

What I claim as new, and desire to secure by Letters Patent, is—

1. The above-described arrangement of reel, cutting apparatus, and platform, all oblique to the line of draft, or reel acting obliquely over any platform, or any other substantially equivalent device, whereby the grain is at once reeled down, cut, and conveyed over the platform in a continuously-straight line, and at the same time delivered at a sufficient distance from the standing grain to permit the passage of the horses between it and the cut grain when cutting the next swath.

2. So placing the reel, as above described, that the reel-rods will strike the grain when they enter it outside of the line passing through the point of the divider and parallel to the line of draft.

3. Placing the grain-wheel in a plane intersecting the line of draft, so that it may relieve or counteract the side draft, as above set forth.

4. Placing the axis of the grain-wheel (when so located in a plane intersecting the line of draft) in a plane which passes vertically through the center of the master-wheel, so that it may at the same time give ease in turning at the corners, as above set forth.

5. The combination of the metal groove U and the sickle $h$ (the length of which is that of the cut of the machine) for the purpose of enabling me to place the grain-wheel opposite the end of the sickle, and at the same time with its point of bearing on the ground within the space cleared by the divider, as set forth.

6. The longer and divergent finger next to the divider, substantially as and for the purposes above set forth and described.

7. The sickle-tooth $d$, serrated on the smooth side and beveled on the other, substantially as and for the purposes above set forth and described.

8. The alternate spaces in the rear of the sickle bar and teeth, combined with the shoulders on the fingers, against which the sickle-bar works, for the purpose of alternating the bearings, as and for the purposes above set forth and described.

9. The cone $t$ on the knee-lever O, substantially as described, and for the purposes above set forth.

10. And, finally, disclaiming the broad device of guides to return the rake in a different path from that in which it advanced, I claim the combination of the rake K, swinging from one arm of the reel, with the spring-plate guides R, by which, when the rake has delivered the grain at the end of the platform, it is prevented from swinging back and coming in contact with the falling grain, as described.

In testimony whereof I have signed my name before two subscribing witnesses.

ABNER WHITELEY.

Witnesses:
 JOHN L. SMITH,
 WILLIAM I. MARTIN.